(12) United States Patent
Xu et al.

(10) Patent No.: US 11,708,280 B2
(45) Date of Patent: Jul. 25, 2023

(54) METHOD OF PREPARING MOF-COATED MONOCRYSTAL TERNARY POSITIVE ELECTRODE MATERIAL

(71) Applicants: GEM CO., LTD., Guangdong (CN); JINGMEN GEM CO., LTD., Hubei (CN)

(72) Inventors: Kaihua Xu, Guangdong (CN); Zhenkang Jiang, Guangdong (CN); Kun Zhang, Guangdong (CN); Xiaofei Xue, Guangdong (CN); Cong Li, Guangdong (CN); Haibo Sun, Guangdong (CN); Kang Chen, Guangdong (CN); Jun Li, Guangdong (CN); Liangjiao Fan, Guangdong (CN)

(73) Assignees: GEM CO., LTD., Guangdong (CN); JINGMEN GEM CO., LTD., Hubei (CN)

( * ) Notice: Subject to any disclaimer, the term of this patent is extended or adjusted under 35 U.S.C. 154(b) by 0 days.

(21) Appl. No.: 17/848,405

(22) Filed: Jun. 24, 2022

(65) Prior Publication Data

US 2022/0356075 A1 Nov. 10, 2022

Related U.S. Application Data

(63) Continuation of application No. PCT/CN2019/129254, filed on Dec. 27, 2019.

(30) Foreign Application Priority Data

Dec. 26, 2019 (CN) .......................... 201911369792.9

(51) Int. Cl.
| | |
|---|---|
| *C01G 53/00* | (2006.01) |
| *C01G 45/12* | (2006.01) |
| *C01G 51/00* | (2006.01) |
| *H01M 10/0525* | (2010.01) |

(52) U.S. Cl.
CPC ......... *C01G 53/44* (2013.01); *C01G 45/1214* (2013.01); *C01G 51/44* (2013.01); *H01M 10/0525* (2013.01); *C01P 2006/40* (2013.01); *H01M 2220/20* (2013.01)

(58) Field of Classification Search
CPC .... C01G 53/44; C01G 45/1214; C01G 51/44; H01M 10/0525

USPC ...................................................... 423/420.2
See application file for complete search history.

(56) References Cited

FOREIGN PATENT DOCUMENTS

| | | | | |
|---|---|---|---|---|
| CN | 103794778 | 5/2014 | | |
| CN | 106159251 | 11/2016 | | |
| CN | 107528060 | 12/2017 | | |
| CN | 108336316 | 7/2018 | | |
| CN | 109208030 | 1/2019 | | |
| CN | 109244447 | 1/2019 | | |
| CN | 109244447 A | * | 1/2019 | ........ H01M 10/0525 |
| KR | 102054142 | 1/2020 | | |

OTHER PUBLICATIONS

"International Search Report (Form PCT/ISA/210) of PCT/CN2019/129254", dated Sep. 27, 2020, with English translation thereof, pp. 1-4.

"Written Opinion of the International Searching Authority (Form PCT/ISA/237) of PCT/CN2019/129254", dated Sep. 27, 2020, pp. 1-4.

"Office Action of China Counterpart Application" with English translation thereof, dated Sep. 23, 2020, p. 1-p. 14.

* cited by examiner

*Primary Examiner* — Melissa S Swain
(74) *Attorney, Agent, or Firm* — JCIP Global Inc.

(57) ABSTRACT

The present invention provides a method of preparing an MOF-coated monocrystal ternary positive electrode material. Firstly, a solution A of nickel, cobalt and manganese metal salts, an ammonia complexing agent solution and a caustic soda liquid are added to a reactor for reaction to obtain a precursor core; then, an organic carboxylate is dissolved in an amount of an organic solvent to obtain a solution B; the solution B and a manganese metal salt solution with a given concentration are added to the reactor and aged to obtain an MOF-coated core-shell structure precursor; the core-shell structure precursor is pre-sintered at a low temperature to obtain a nickel-cobalt-manganese oxide with monocrystal structure; the nickel-cobalt-manganese oxide with monocrystal structure is uniformly mixed with LiOH·H$_2$O in a mortar and then calcined at a high temperature to obtain an MOF-coated monocrystal ternary positive electrode material.

10 Claims, 6 Drawing Sheets

METHOD OF PREPARING MOF-COATED MONOCRYSTAL TERNARY POSITIVE ELECTRODE MATERIAL

CROSS-REFERENCE TO RELATED APPLICATION

This application is a continuation of international application of PCT application serial no. PCT/CN2019/129254 filed on Dec. 27, 2019, which claims the priority benefit of China application no. 201911369792.9, filed on Dec. 26, 2019. The entirety of each of the above mentioned patent applications is hereby incorporated by reference herein and made a part of this specification.

BACKGROUND

Technical Field

The present invention belongs to the field of lithium battery, relates to a method of preparing a lithium battery positive electrode material and in particular to a method of preparing an MOF-coated monocrystal ternary positive electrode material and a precursor thereof.

Description of Related Art

Along with fast development of society, new energy power battery vehicles have come into the lives of people gradually and are expected to become mainstream by 2020, which thus requires high capacity, high thermal stability and high cyclic stability for the power batteries. Lithium ion batteries have taken an important position in the energy storage market due to their high capacity. A ternary material combines the advantages of three materials Ni, Co and Mn through their synergistic effect: $LiCoO_2$ has good cyclic performance, $LiNiO_2$ has high specific capacity and $LiMnO_2$ has high safety and low costs and the like. Therefore, the ternary material has become one of the novel lithium ion battery positive electrode materials having the highest prospect of development. Since the high nickel ternary positive electrode material has a high specific capacity and thus becomes one of major developments of the future positive electrode materials. However, along with increasing content of nickel, the cyclic and thermal stabilities of the material are lowered accordingly, further affecting the cycle life and safety of the batteries. At present, the most effective solution to this problem is to prepare a core-shell structure with a high-nickel and low-manganese core and a high-manganese and low-nickel shell, so as to increase the stability of the material and improve the capacity of the positive electrode material.

The Metal Organic Framework (MOF) material has become an emerging material drawing attention of the research workers in recent years due to the advantages of high specific surface area, structural controllability, porosity and large specific surface area and the like. Since the material is highly ordered at the nano-level and the particles formed are at nano-level, it is guaranteed that the material can be uniformly dispersed at the atomic level.

The precursor material of the core-shell structure prepared by ordinary co-precipitation method is a spherical particle formed mainly by reacting a nickel-cobalt-manganese metal salt solution with an ammonia complexing agent and a caustic soda liquid. This precursor material can be uniformly mixed with Li salt only with a cosolvent when subsequently mixed with Li salt, and the temperature required for calcination is high, resulting in high costs. Therefore, the structural stability formed finally through calcination is poor, thereby affecting the electrochemical properties of the positive electrode material.

SUMMARY

In order to overcome the problems in the prior arts, the present invention provides a method of preparing an MOF-coated monocrystal ternary positive electrode material and a precursor thereof, so as to solve the problem of non-coexistence of higher specific capacity and higher cyclic life obtained through high nickel and safety.

In the present invention, in a reaction, a core uses a high-nickel and low-manganese precursor and a shell uses an Mn-based metal organic framework (Mn-MOF) synthesized by coordination using Mn and an organic matter carboxylate. This Mn-MOF material is an infinitely-ordered monocrystal structure compound which can ensure the uniformity of Mn of the shell at the atomic level.

The core-shell structure synthesized in the present invention can be pre-sintered at a low temperature to form a nickel-cobalt-manganese oxide with monocrystal structure because the shell is an MOF material coated by monocrystal structure. Further, addition of a cosolvent is not required when the nickel-cobalt-manganese oxide is mixed with Li salt. This is because the shell-coated monocrystal structure helps to diffuse Li.

Since the ternary positive electrode material with monocrystal structure synthesized in the present invention is highly ordered at the nano-level, the migration path of Li is shortened, thus improving the rate performance of the positive electrode material.

In order to solve the above technical problems, the present invention adopts the following solution.

There is provided a method of preparing an MOF-coated monocrystal ternary positive electrode material, which includes the following steps.

At step 1, a solution A of nickel, cobalt and manganese metal salts is prepared according to a molar ratio of x:y:1-x-y, where a concentration of the solution A is 2-5 mol/L; an ammonia complexing agent solution and a caustic soda liquid (sodium hydroxide, sodium carbonate or potassium hydroxide) solution are prepared at a given concentration, where an ammonia concentration is 7-14 g/L, $0.6 \leq x \leq 0.98$ and $0.01 \leq y \leq 0.2$.

At step 2, the solution A, the ammonia complexing agent solution and the caustic soda liquid (e.g. sodium hydroxide solution) are added to a reactor at a feeding speed for reaction of 60-120 h at the temperature of 40-70° C. so as to obtain a precursor core of better sphericity: $Ni_xCo_yMn_{1-x-y}(OH)_2$, where an average particle size of the precursor core is 3-8 μm; a flow rate of the solution A is 6-9 L/h, a flow rate of the ammonia is 1-1.5 L/h, a flow rate of the caustic soda liquid is 2.5-3.5 L/h, and a stirring speed is 250-500 r/min.

At step 3, an organic carboxylate (5-hydroxyisophthalic acid, trimesic acid, 1,2,4,5-benzenetetracarboxylic acid) is dissolved in an amount of an organic solvent (for example, methanol or ethanol or the like) to obtain a solution B of a concentration of 2 mol/L; the solution B and a manganese metal salt solution of a given concentration are added to the above reactor at a feeding speed to perform reaction for 3-6 h at a stirring speed of 300-400 r/min under a temperature of 25-40° C., and then perform aging for 2-5 h to obtain an MOF-coated monocrystal ternary positive electrode material precursor where the structure of the monocrystal ternary positive electrode material precursor is $MOF-Ni_xCo_yMn_{1-x}$ (OH)$_2$, the core of the monocrystal ternary positive electrode material precursor is high nickel, and the shell is an Mn-MOF monocrystal-coated pure manganese core shell material. In the high nickel core, a molar percent of Ni to the total metals is 70-90%, a molar percent of Co to the total metals is 5-20%, a molar percent of Mn to the total metals is 10-30%, a concentration of the manganese metal salt solution is 0.5-2 mol/L and a particle size of the MOF-Ni$_x$Co$_y$Mn$_{1-x}$(OH)$_2$ is 4-9 μm.

At step 4, the core-shell structure precursor with the high nickel core and the Mn-MOF monocrystal-coated shell (i.e. the monocrystal ternary positive electrode material precursor) is pre-sintered for 3-6 h at a temperature of 300-600° C. to obtain a nickel-cobalt-manganese oxide with monocrystal structure. The nickel-cobalt-manganese oxide with monocrystal structure and LiOH·H$_2$O are uniformly mixed in a mortar according to a stoichiometric ratio (e.g. 1:1.5) and calcined for 10-20 h at a temperature of 700-800° C. to obtain the MOF-coated monocrystal ternary positive electrode material with monocrystal structure.

The present invention has the following beneficial effects.

1. In the present invention, in a reaction, the core uses a high-nickel and low-manganese precursor and the shell uses an Mn-based metal organic framework (Mn-MOF) synthesized by coordination using Mn and an organic carboxylate. This Mn-MOF material is an infinitely-ordered monocrystal structure compound which can ensure the uniformity of Mn of the shell at the atomic level.

2. The core-shell structure synthesized in the present invention can be pre-sintered at a low temperature to form a nickel-cobalt-manganese oxide with monocrystal structure because the shell is an MOF material coated by monocrystal structure. Further, addition of a cosolvent is not required when the oxide is mixed with Li salt, but uniform mixing can be achieved at the atomic level.

3. Since the ternary positive electrode material with monocrystal structure synthesized in the present invention is highly ordered at the nano-level, the migration path of Li is shortened, thus improving the rate performance of the positive electrode material.

4. The synthesized core-shell material with the high-nickel and low-manganese core and the Mn-MOF monocrystal-coated shell is pre-sintered at a low temperature to obtain a nickel-cobalt-manganese oxide with monocrystal structure which can then be uniformly mixed with Li without a cosolvent to finally obtain a ternary positive electrode material with monocrystal structure having the electrochemical properties of high rate, high capacity and high cyclic performance.

DESCRIPTION OF THE EMBODIMENTS

Embodiment 1

Figure 1:
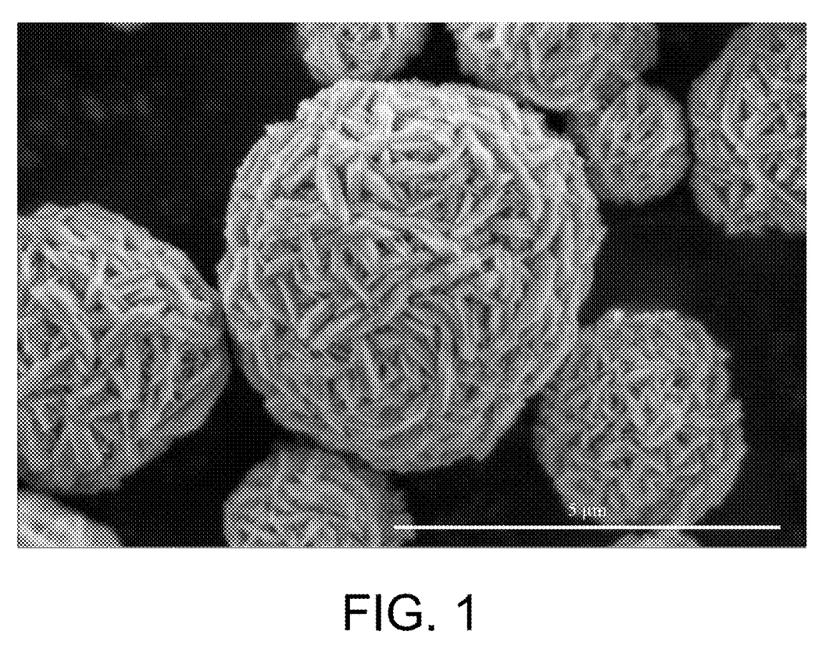
FIG. 1 is a SEM diagram illustrating an MOF-coated core-shell structure precursor obtained according to a first embodiment of the present invention.
Figure 2:
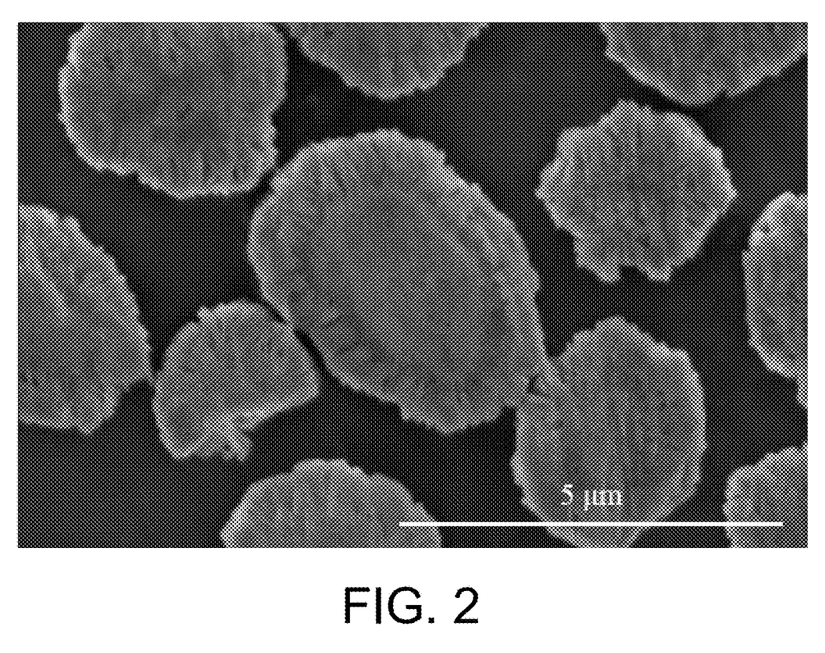
FIG. 2 is a sectional SEM diagram illustrating an MOF-coated core-shell structure precursor obtained according to a first embodiment of the present invention.
Figure 3:
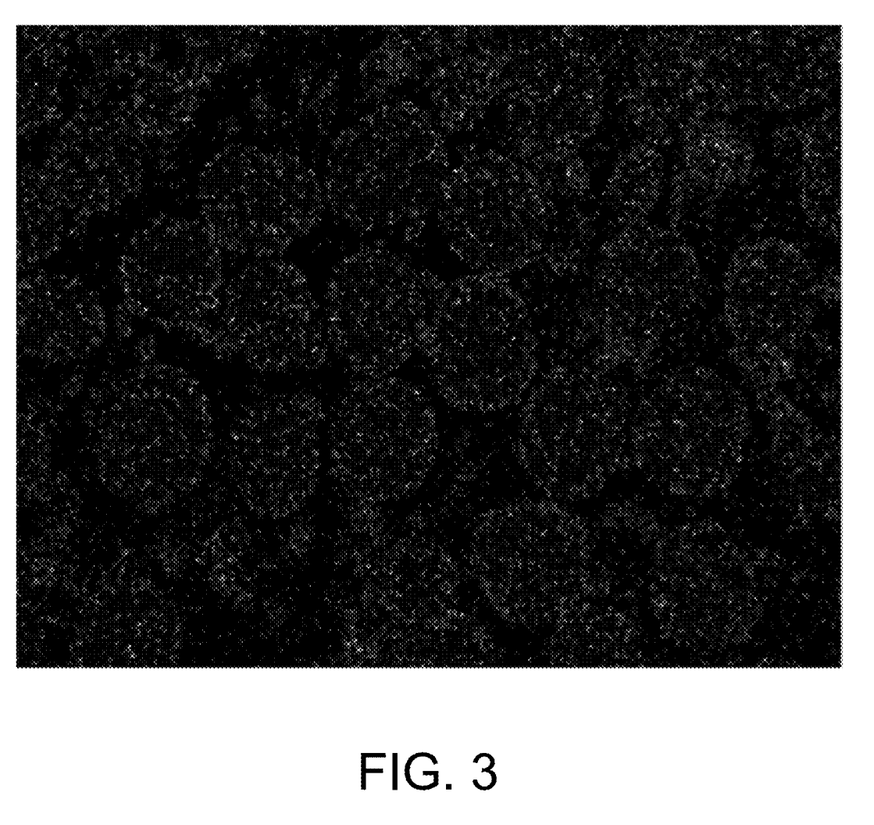
FIG. 3 is an EDS diagram illustrating a core-shell structure precursor obtained according to a first embodiment of the present invention, where the interior of the spheres represents a metal Ni element and the exterior of the spheres represents a metal Mn element.
Figure 4:
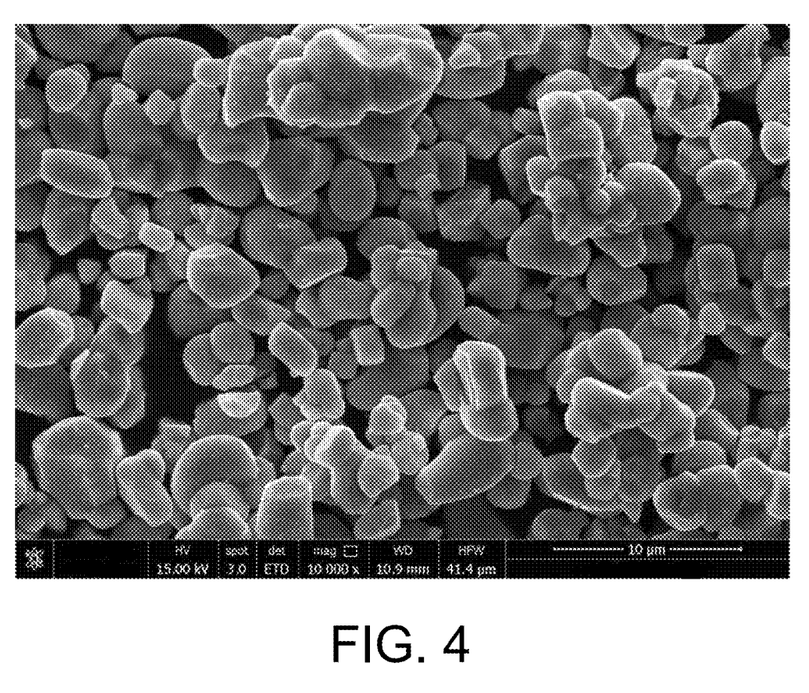
FIG. 4 is an MOF-coated monocrystal ternary positive electrode material obtained according to a first embodiment of the present invention.
Figure 5:
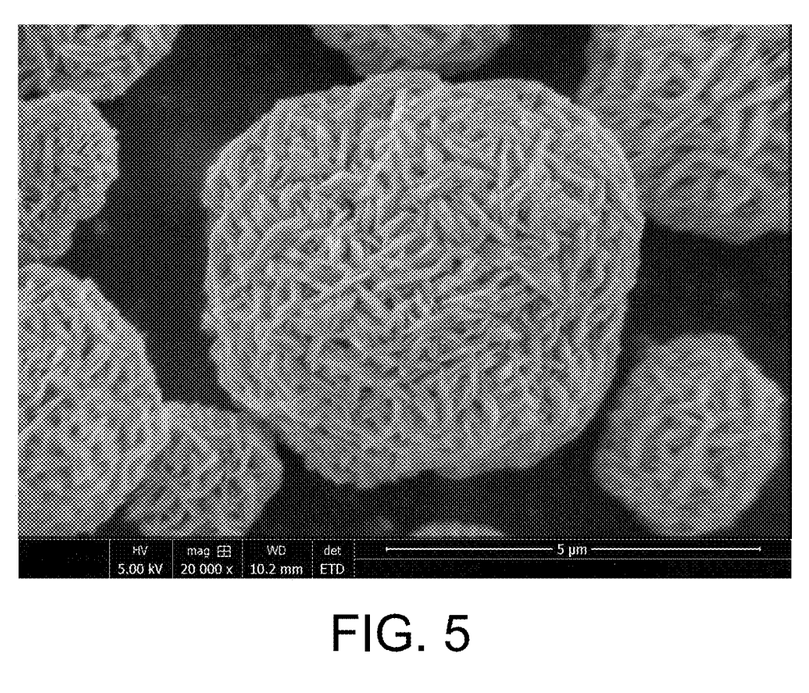
FIG. 5 is a SEM diagram illustrating an MOF-coated core-shell structure precursor obtained according to a second embodiment of the present invention.
Figure 6:
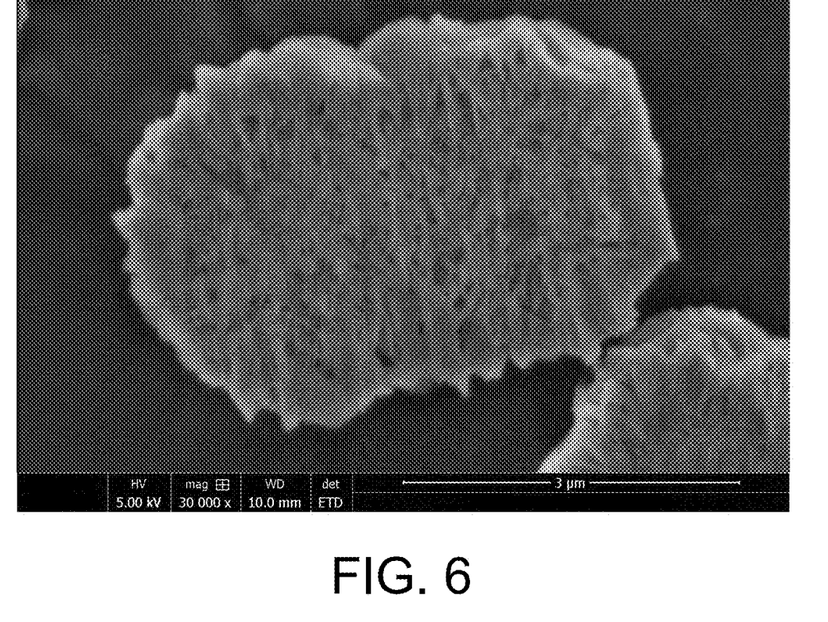
FIG. 6 is a sectional SEM diagram illustrating an MOF-coated core-shell structure precursor obtained according to a second embodiment of the present invention.
Figure 7:
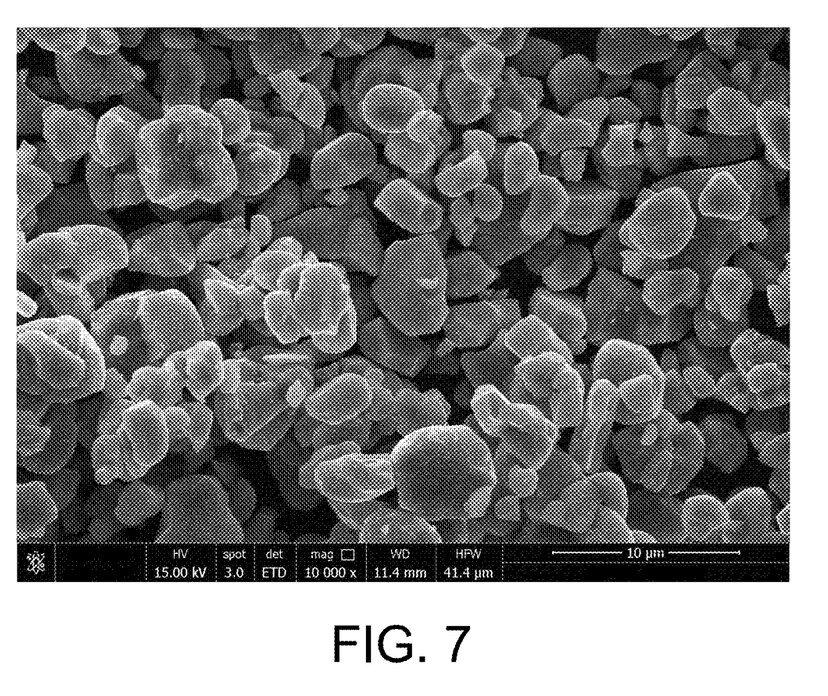
FIG. 7 is an MOF-coated monocrystal ternary positive electrode material obtained according to a second embodiment of the present invention.
Figure 8:
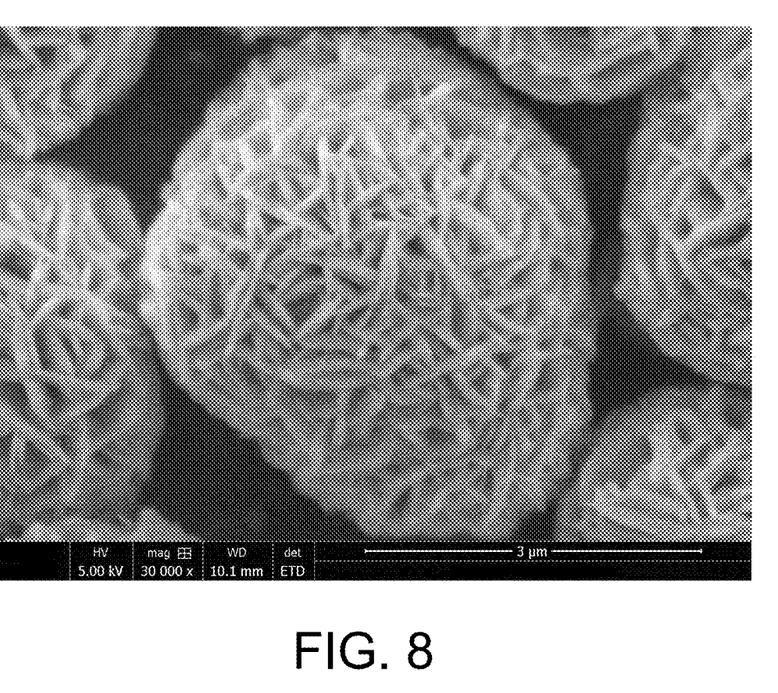
FIG. 8 is a SEM diagram illustrating an MOF-coated core-shell structure precursor obtained according to a third embodiment of the present invention.
Figure 9:
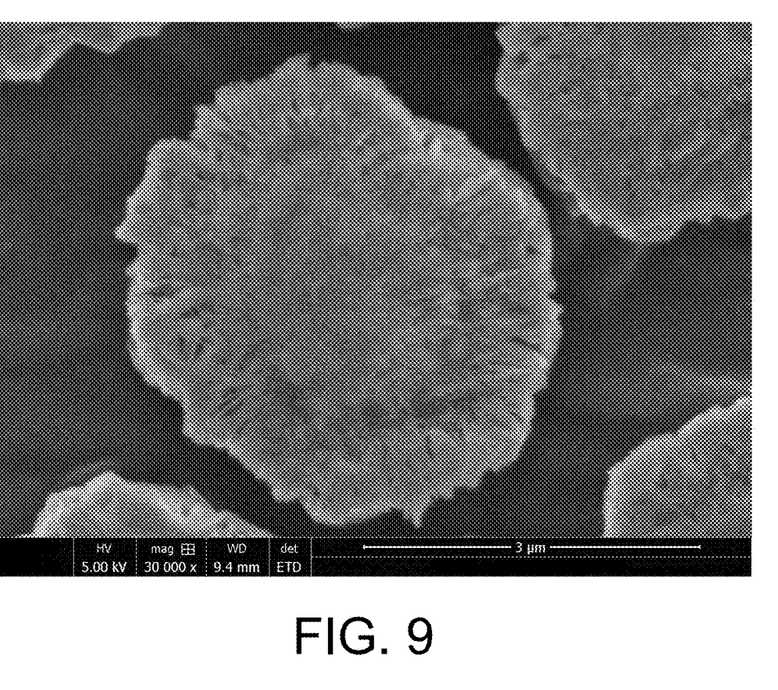
FIG. 9 is a sectional SEM diagram illustrating an MOF-coated core-shell structure precursor obtained according to a third embodiment of the present invention.
Figure 10:
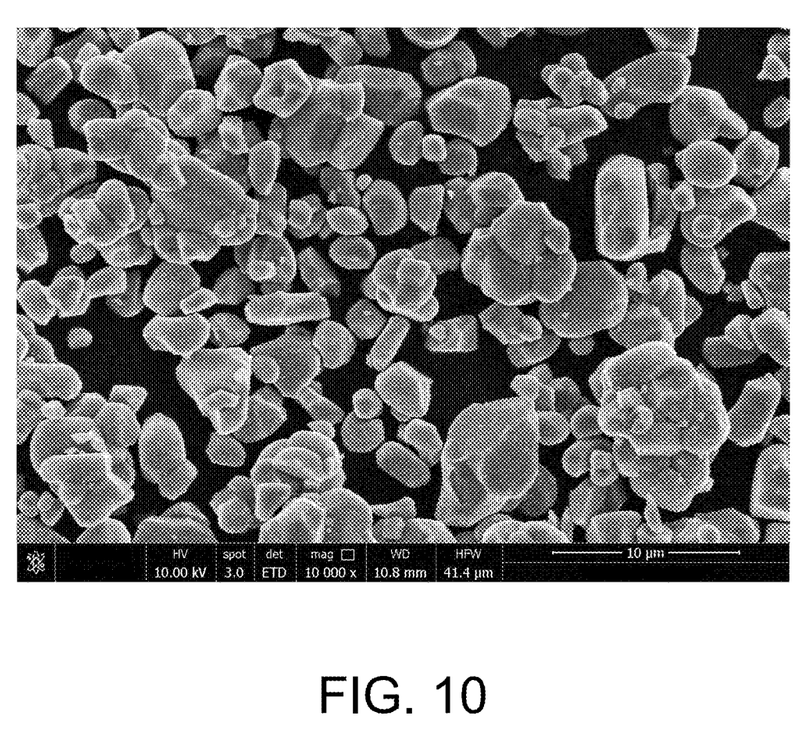
FIG. 10 is an MOF-coated monocrystal ternary positive electrode material obtained according to a third embodiment of the present invention.

At step 1, a nickel-cobalt-manganese salt solution of a metal molar ratio of 82:8:10 (a metal concentration is 2 mol/L) was added to a reactor by using a metering pump at a flow rate of 6 L/h, and meanwhile, ammonia of 12 g/L and sodium hydroxide of 3 mol/L were added to the reactor at the flow rates of 1 L/h and 2.5 L/h respectively, where during a reaction process, pH value of the system was adjusted to be between 10.5 and 12.0 by controlling the flow rates of ammonia and sodium hydroxide. Nitrogen was introduced into the sealed reactor at the flow rate of 2 L/h. The stirring speed of a stirring paddle was 400 r/min and a reaction temperature of the system was 62° C. During the reaction, a particle size of the particles in the reactor was detected by using a laser particle sizer at an interval of one hour. By observing the morphology of primary particles and secondary particles of process samples, the primary particles were controlled to be flake-shaped homogeneously-agglomerated spherical particles. When the average particle size of the spherical particles reached 3.0 μm, feeding was stopped to obtain a nickel-cobalt-manganese hydroxide Ni$_{0.82}$Co$_{0.08}$Mn$_{0.1}$(OH)$_2$.

At step 2, 5-hydroxyisophthalic acid was dissolved in an amount of ethanol to obtain a mixed solution with a concentration of 2 mol/L; the 5-hydroxyisophthalic acid solution of 2 mol/L and a manganese metal salt solution of 1.5 mol/L were added to the above reactor at a feeding speed to perform reaction for 4 h at the temperature of 40° C. at the stirring speed of 350 r/min and then perform aging for 2 h to obtain a core-shell structure precursor with a particle size being 5.0 μm and the shell being Mn-MOF monocrystal-coated (the structural formula is MOF-Ni$_{0.82}$Co$_{0.08}$Mn$_{0.1}$(OH)$_2$), where the core of the precursor is high nickel, the shell is a pure manganese core-shell material, and the chemical formula of the Mn-MOF is Mn(C$_8$H$_3$O$_5$)$_2$·2H$_2$O.

At step 3, 5 Kg of MOF-Ni$_{0.82}$Co$_{0.08}$Mn$_{0.1}$(OH)$_2$ precursor was calcined at the temperature of 350° C. to obtain a nickel-cobalt-manganese oxide with monocrystal structure (the structural formula is Ni$_{0.8}$Co$_{0.05}$Mn$_{0.15}$O$_{1.5}$). The oxide and 4.5 Kg of LiOH·H$_2$O were uniformly mixed in a Henshel mixer and then calcined for 10 h under the atmosphere of oxygen at the temperature of 700° C. and then pulverized and screened to finally obtain a nickel-cobalt-manganese positive electrode material with monocrystal structure. The positive electrode material was assembled to form a CR2025 button cell which was subjected to electrochemical property detection. The detection result showed that: with a current density of 0.1 C (17 mA/g) and a voltage range of 2.5-4.3V, the discharge capacity was 196.56 mA/g and the capacity retention rate of 1 C 50 cycles was 97.56%.

Embodiment 2

At step 1, a nickel-cobalt-manganese salt solution of a metal molar ratio of 75:13:12 (a metal concentration is 2 mol/L) was added to a reactor by using a metering pump at a flow rate of 6 L/h, and meanwhile, ammonia of 12 g/L and sodium hydroxide of 3 mol/L were added to the reactor at the flow rates of 1 L/h and 2.5 L/h respectively, where during a reaction process, pH value of the system was adjusted to be between 10.5 and 12.0 by controlling the flow rates of ammonia and sodium hydroxide. Nitrogen was introduced into the sealed reactor at the flow rate of 2 L/h. The stirring speed of a stirring paddle was 400 r/min and a reaction temperature of the system was 62° C. During the reaction, a particle size of the particles in the reactor was detected by using a laser particle sizer at an interval of one hour. By observing the morphology of primary particles and secondary particles of process samples, the primary particles were controlled to be flake-shaped homogeneously-agglomerated spherical particles. When the average particle size of the spherical particles reached 3.8 μm, feeding was stopped to obtain a nickel-cobalt-manganese hydroxide $Ni_{0.75}Co_{0.13}Mn_{0.12}(OH)_2$.

At step 2, 5-hydroxyisophthalic acid was dissolved in an amount of ethanol to obtain a mixed solution with a concentration of 2 mol/L; the 5-hydroxyisophthalic acid solution of 2 mol/L and a manganese metal salt solution of 1.5 mol/L were added to the above reactor at a feeding speed to perform reaction for 4 h at the temperature of 40° C. at the stirring speed of 350 r/min and then perform aging for 2 h to obtain a core-shell structure precursor with a particle size being 5.5 μm and the shell being Mn-MOF monocrystal-coated (the structural formula is MOF-$Ni_{0.75}Co_{0.13}Mn_{0.12}$ $(OH)_2$), where the core of the precursor is high nickel, the shell is a pure manganese core-shell material, and the chemical formula of the Mn-MOF is $Mn(C_8H_3O_5)_2 \cdot 2H_2O$.

At step 3, 5 Kg of MOF-$Ni_{0.75}Co_{0.13}Mn_{0.12}(OH)_2$ precursor was calcined at the temperature of 350° C. to obtain a nickel-cobalt-manganese oxide with monocrystal structure (the structural formula is $Ni_{0.7}Co_{0.1}Mn_{0.2}O_{1.5}$). The oxide and 4.5 Kg of $LiOH \cdot H_2O$ were uniformly mixed in a Henshel mixer and then calcined for 10 h under the atmosphere of oxygen at the temperature of 700° C. and then pulverized and screened to finally obtain a nickel-cobalt-manganese positive electrode material with monocrystal structure. The positive electrode material was assembled to form a CR2025 button cell which was subjected to electrochemical property detection. The detection result showed that: with a current density of 0.1 C (17 mA/g) and a voltage range of 2.5-4.3V, the discharge capacity was 186.56 mA/g and the capacity retention rate of 1 C 50 cycles was 98.56%.

Embodiment 3

At step 1, a nickel-cobalt-manganese salt solution of a metal molar ratio of 90:5:5 (a metal concentration is 2 mol/L) was added to a reactor by using a metering pump at a flow rate of 6 L/h, and meanwhile, ammonia of 12 g/L and sodium hydroxide of 3 mol/L were added to the reactor at the flow rates of 1 L/h and 2.5 L/h respectively, where during a reaction process, pH value of the system was adjusted to be between 10.5 and 12.0 by controlling the flow rates of ammonia and sodium hydroxide. Nitrogen was introduced into the sealed reactor at the flow rate of 2 L/h. The stirring speed of a stirring paddle was 400 r/min and a reaction temperature of the system was 62° C. During the reaction, a particle size of the particles in the reactor was detected by using a laser particle sizer at an interval of one hour. By observing the morphology of primary particles and secondary particles of process samples, the primary particles were controlled to be flake-shaped homogeneously-agglomerated spherical particles. When the average particle size of the spherical particles reached 3.0 μm, feeding was stopped to obtain a nickel-cobalt-manganese hydroxide $Ni_{0.9}Co_{0.05}Mn_{0.05}(OH)_2$.

At step 2, 5-hydroxyisophthalic acid was dissolved in an amount of ethanol to obtain a mixed solution with a concentration of 2 mol/L; the 5-hydroxyisophthalic acid solution of 2 mol/L and a manganese metal salt solution of 1.5 mol/L were added to the above reactor at a feeding speed to perform reaction for 4 h at the temperature of 40° C. at the stirring speed of 350 r/min and then perform aging for 2 h to obtain a core-shell structure precursor with a particle size being 4.5 μm and the shell being Mn-MOF monocrystal-coated (the structural formula is MOF-$Ni_{0.9}Co_{0.05}Mn_{0.05}$ $(OH)_2$), where the core of the precursor is high nickel, the shell is a pure manganese core-shell material, and the chemical formula of the Mn-MOF is $Mn(C_8H_3O_5)_2 \cdot 2H_2O$.

At step 3, 5 Kg of MOF-$Ni_{0.9}Co_{0.05}Mn_{0.05}(OH)_2$ precursor was calcined at the temperature of 350° C. to obtain a nickel-cobalt-manganese oxide with monocrystal structure (the structural formula is $Ni_{0.87}Co_{0.03}Mn_{0.1}O_{1.5}$). The oxide and 4.5 Kg of $LiOH \cdot H_2O$ were uniformly mixed in a Henshel mixer and then calcined for 10 h under the atmosphere of oxygen at the temperature of 700° C. and then pulverized and screened to finally obtain a nickel-cobalt-manganese positive electrode material with monocrystal structure. The positive electrode material was assembled to form a CR2025 button cell which was subjected to electrochemical property detection. The detection result showed that: with a current density of 0.1 C (17 mA/g) and a voltage range of 2.5-4.3V, the discharge capacity was 201.56 mA/g and the capacity retention rate of 1 C 50 cycles was 96.56%.

It should be noted that unless otherwise stated or defined clearly, the above reaction parameters and component ratios are merely illustrative and not used to limit the specific implementations of the present invention. Those skilled in the art may understand the specific meaning of the terms in the present invention based on actual situations.

The above are merely preferred embodiments of the present invention. It should be pointed out that those skilled in the art may make several improvements and replacements without departing from the technical principle of the present invention and these improvements and replacements are considered to be within the scope of protection of the present invention.

What is claimed is:

1. A method of preparing an MOF-coated monocrystal ternary positive electrode material, comprising following steps:
   at step 1, preparing a solution A of nickel, cobalt and manganese metal salts according to a molar ratio of x:y:1-x-y, wherein x represents a ratio of nickel, y represents a ratio of cobalt and 1-x-y represents a ratio of manganese; and preparing an ammonia complexing agent solution and a caustic soda liquid;
   at step 2, adding the solution A of nickel, cobalt and manganese metal salts, the ammonia complexing agent solution and the caustic soda liquid to a reactor at a feeding speed, and the solution A of nickel, cobalt and manganese metal salts, the ammonia complexing agent solution and the caustic soda liquid are reacted to obtain a sphere-like precursor core;

at step 3, dissolving an organic carboxylate in an amount of an organic solvent to obtain a solution B with a given concentration; adding the solution B and a manganese metal salt solution with a given concentration to the reactor yielding the sphere-like precursor core in the step 2 at a feeding speed, and the sphere-like precursor core, the solution B and the manganese metal salt solution are reacted and aged to obtain an MOF-coated core-shell structure precursor, wherein a structural formula of the MOF-coated core-shell structure precursor is MOF-Ni$_x$Co$_y$Mn$_{1-x-y}$(OH)$_2$, a core of the MOF-coated core-shell structure precursor is a nickel-cobalt-manganese hydroxide, and a shell uses an Mn-based metal organic framework synthesized by coordination using Mn and the organic carboxylate; and at step 4, presintering the MOF-coated core-shell structure precursor obtained in the step 3 at a low temperature to obtain a nickel-cobalt-manganese oxide with monocrystal structure; uniformly mixing the nickel-cobalt-manganese oxide with monocrystal structure and LiOH·H$_2$O in a mortar according to a stoichiometric ratio to obtain a mixture and calcining the mixture under an atmosphere of oxygen at a high temperature to obtain the MOF-coated monocrystal ternary positive electrode material, in the step 1, a range of the molar ratios is 0.6≤x≤0.98 and 0.01≤y≤0.2, in the step 4, the presintering at the low-temperature refers to calcining for 3-6 h at a temperature of 300-600° C.; in the step 4, the calcination at the high temperature refers to calcining for 10-20 h at a temperature of 700-800° C.

2. The method of preparing the MOF-coated monocrystal ternary positive electrode material of claim 1, wherein the caustic soda liquid is any one or a combination of several of sodium hydroxide, sodium carbonate and potassium hydroxide.

3. The method of preparing the MOF-coated monocrystal ternary positive electrode material of claim 1, wherein in the step 2, a reaction temperature of the reactor is 40-70° C. with a reaction time being 60-120 h.

4. The method of preparing the MOF-coated monocrystal ternary positive electrode material of claim 1, wherein the sphere-like precursor core obtained in the step 2 is Ni$_x$Co$_y$Mn$_{1-x-y}$(OH)$_2$ and an average particle size of the sphere-like precursor core is 3-8 μm.

5. The method of preparing the MOF-coated monocrystal ternary positive electrode material of claim 1, wherein in the step 3, a particle size of the MOF-coated core-shell structure precursor MOF-Ni$_x$Co$_y$Mn$_{1-x-y}$(OH)$_2$ is 4-9 μm.

6. The method of preparing the MOF-coated monocrystal ternary positive electrode material of claim 1, wherein in the step 2, a concentration of the solution A is 2-5 mol/L, a feeding rate of the solution A is 6-9 L/h, the ammonia complexing agent solution is an ammonia with a concentration of 7-14 g/L, a feeding rate of the ammonia is 1-1.5 L/h, a feeding rate of the caustic soda liquid is 2.5-3.5 L/h, and a stirring speed of the reactor is 250-500 r/min.

7. The method of preparing the MOF-coated monocrystal ternary positive electrode material of claim 1, wherein in the step 3, the organic carboxylate is any one or a combination of several of 5-hydroxyisophthalic acid, trimesic acid, and 1,2,4,5-benzenetetracarboxylic acid.

8. The method of preparing the MOF-coated monocrystal ternary positive electrode material of claim 1, wherein in the step 3, the organic solvent is an alcohol organic solvent and a concentration of the obtained solution B is 1.5-2.5 mol/L.

9. The method of preparing the MOF-coated monocrystal ternary positive electrode material of claim 1, wherein in the step 3, a reaction condition in the reactor is as follows: a temperature of 25-40° C., a stirring speed of 300-400 r/min, a time of 3-6 h and an aging time of 2-5 h.

10. The method of preparing the MOF-coated monocrystal ternary positive electrode material of claim 1, wherein in the step 3, in the core of the MOF-coated core-shell structure precursor MOF-Ni$_x$Co$_y$Mn$_{1-x-y}$(OH)$_2$, a molar percent of nickel to total metals is 70-90%, a molar percent of cobalt to total metals is 5-20% and a molar percent of manganese to total metals is 10-30%.

* * * * *